Nov. 27, 1951  J. C. MORRIS  2,576,802
FOOD CHOPPING ATTACHMENT
Filed Nov. 15, 1948  2 SHEETS—SHEET 1
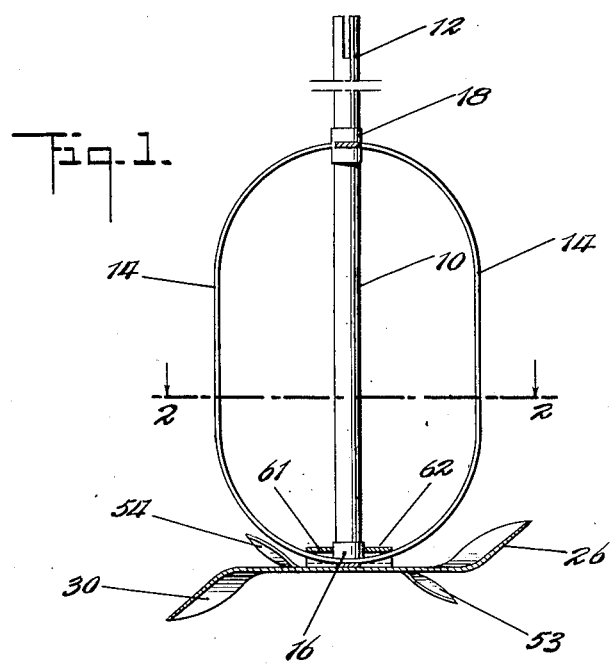
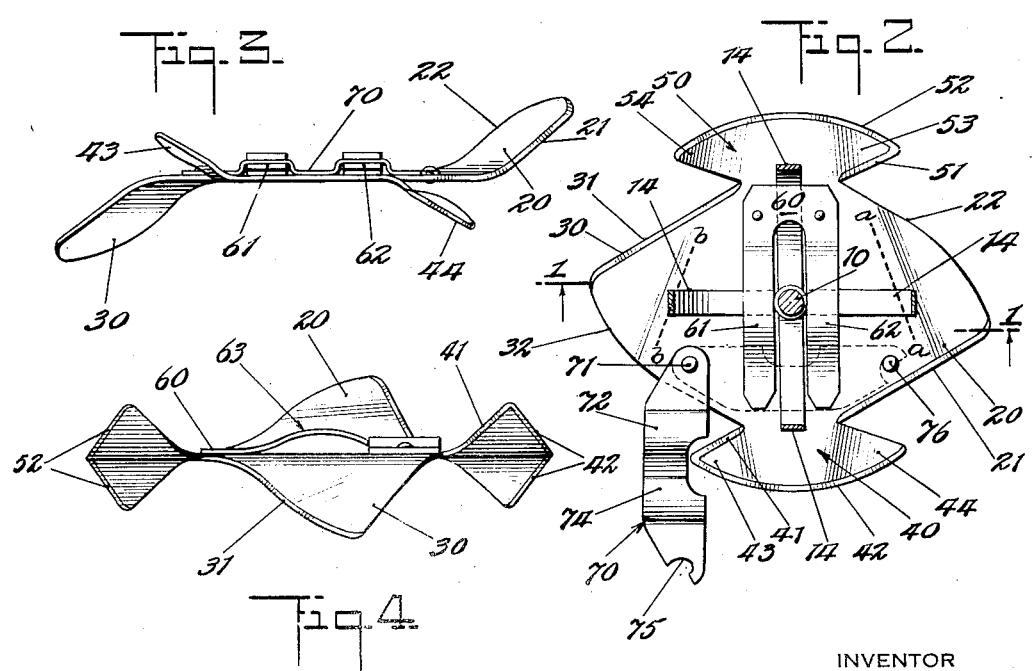
INVENTOR
JANET C. MORRIS
BY HER ATTORNEYS
Howson and Howson.

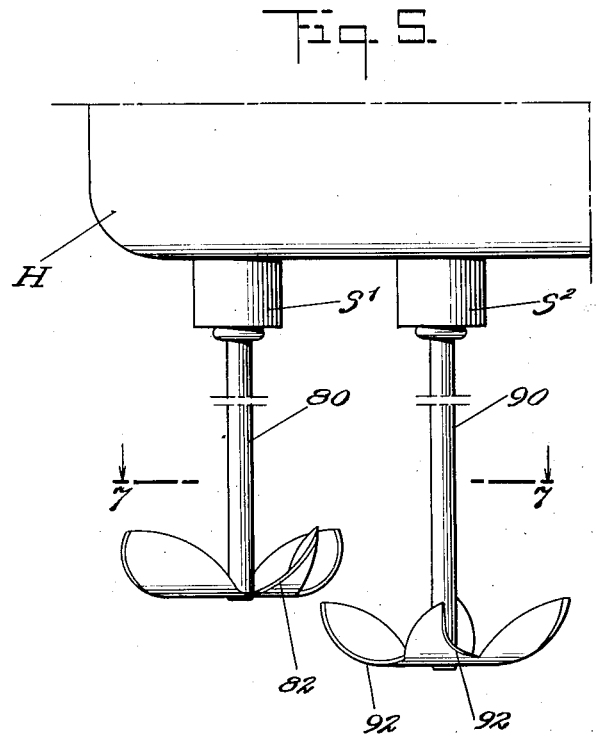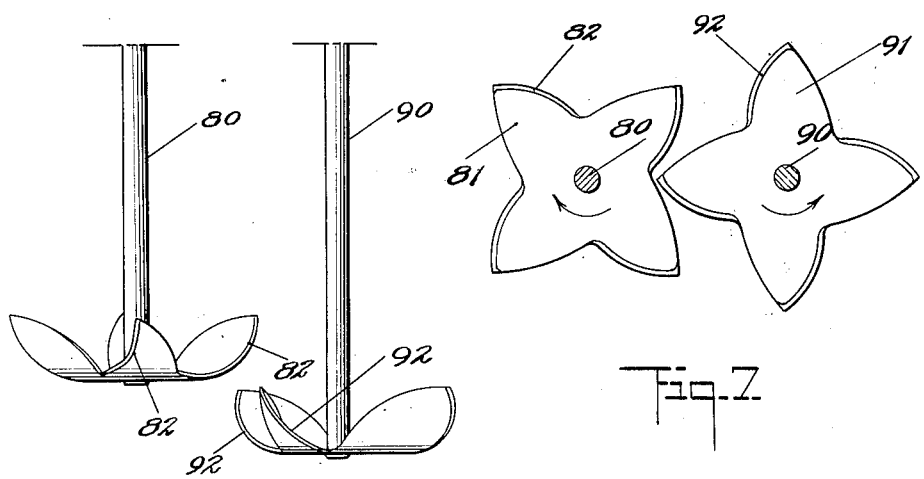

Patented Nov. 27, 1951

2,576,802

UNITED STATES PATENT OFFICE 2,576,802

FOOD CHOPPING ATTACHMENT

Janet C. Morris, New York, N. Y.

Application November 15, 1948, Serial No. 59,998

10 Claims. (Cl. 146—106)

This invention relates to food choppers. More particularly the invention relates to attachments for use with the now commonly-known food mixers driven by small electric motors. Such mixers usually have two sockets into which detachable beaters may be inserted for rotation in opposite directions in intermeshing but non-engaging relation.

Although the invention is capable of use with rotary driving means other than food-mixer motors and in other circumstances, it is particularly designed and adapted for use with food-mixers.

Cooks and housewives often desire to chop up foods in the kitchen for the purpose of making purées, soups and other food preparations, to their own recipe and liking. Blenders and food choppers at present available on the market are relatively expensive and often useful for only a single purpose thus making necessary a relatively large piece of household equipment which must be stored or will be constantly in the way in the kitchen.

Therefore it is an object of my invention to make an attachment which can be readily applied to and removed from the beater of common types of food mixers and which will effectively chop up and finely divide foods.

Another object is to provide food chopper attachments which are adapted for use with the motors of common food-mixers with alteration of the structure of the mixer. A related object is to provide dual cooperating choppers which being inserted in place of the beaters of a food mixer are driven to mutually cooperate in chopping and finely dividing foods of various sorts.

Other objects and advantages of the invention will become apparent as it is described in connection with the accompanying drawings.

In the drawings:

Figure 1 is an elevation view of the invention as applied to the beater of a common type of food mixer;

Figure 2 is a top plan view of the invention illustrated in Figure 1 with the beater in section along line 2—2 of Figure 1;

Figure 3 is a side elevation view of the invention as illustrated in Figure 1;

Figure 4 is a side elevation view similar to Figure 3 but with the device turned 45°;

Figure 5 is a side elevation view of another form of the invention;

Figure 6 is a side elevation view of the invention illustrated in Figure 5 but with the blades rotated about 45°;

Figure 7 is a sectional plan view of the section taken along line 7—7 of Figure 5.

Referring to Figure 1 of the drawings, an attachment is shown applied to the bottom of a conventional beater. As will be recognized from the drawing, the beater comprises a shaft 10 formed at its top as at 12 for detachable connection to a food mixer head and motor (not shown) in conventional manner. Blades 14 being four in number spaced 90° apart flare out from their common fastening 16 at the bottom end of the shaft 10 and come together at a common anchorage 18 in the mid-portion of the shaft.

The juncture of the blades at the bottom affords a means for securing my attachment.

The attachment is preferably formed from sheet metal by die stamping or otherwise, with large central blades 20, 30 of approximately triangular shape extending away from the axis of the shaft in diametrically opposite directions. Although the blades 20, 30 are similar in plan they are differently bent and sharpened at their edges. The blades are or may be approximately straight on their forward edges 21, 31 which are sharpened to a knife edge for cutting and chopping. The trailing edges 22, 32 of said blades may be arcuate. The cutting edge of the blade 20 is bent upwardly into a gently-curving arc increasing in the degree of curvature toward the tip. The trailing edge of blade 20 is bent to curve downwardly and gradually flatten out as it approaches the center line of the whole attachment.

The cutting edge of blade 30 curves downwardly with increasing degree of curvature toward the tip while the trailing edge curves back up with decreasing curvature toward the center line of the whole attachment.

The roll of the blade 20 is preferably along an axis skewed inwardly (looking from trailing to cutting edge) as exemplified but not limited to the dotted line a—a of Fig. 2.

The roll of the blade 30 is preferably along an axis skewed inwardly (looking from trailing to cutting edge) as exemplified but not limited to the dotted line b—b of Fig. 2.

The invention is neither limited to the precise curvatures described nor to rolling along straight or curved axes; nor need the cutting edges be straight or the trailing edges curved. It will be observed, however, that by the form described the orbit of cutting of the blade 20 is above that of the cutting edge 32, thus covering a large space. The attachment is formed with the side blades 40, 50 alongside the central blades but in diametrically opposite positions. These blades each have a short inside cutting edge 41, 51 and a long outside cutting edge 42 and 52 respectively. The blades are joined at one side to the blades 20, 30 while their opposite side edges 42, 52 are arcuate, the curvature approximating the circumference of a circle whose diameter is the diametrical distance between the edges 42, 52. But, the curvature of the edges 42, 52 may be greater or less than that illustrated and need not be identical since, as will now be described, the wings or end portions of each blade are bent in different directions.

Referring to blade 40, the cutting or forward edge 41 from the tip of blade to its connection with blade 30 preferably is, but need not necessarily be, straight as viewed in plan, the end portion 43 of said blade 40 being curved upwardly and the end 44 being curved downwardly. Thus the peripheral cutting edge 42 is sinusoidal in profile.

Referring to blade 50, the cutting or forward edge 51 from the tip of the blade to its connection with blade 20 preferably is, but need not necessarily be, straight as viewed in plan, the end portion 53 of said blade 50 being curved downwardly and the end 54 being curved upwardly so that in profile the cutting edge 52 is sinusoidal.

With the short inner cutting edges 41, 51 respectively directed upwardly and downwardly, it will be observed that the orbits of their cutting will be one above the other. Although orbits of the sinusoidal cutting edges 42, 52 are the same, the direction of the cutting is opposite, 40 tending to cut downwardly and 50 tending to cut upwardly.

To mount the attachment to the bottom of a beater I provide a bifurcated clamp 60 of spring steel or like metal riveted or otherwise permanently secured at its closed end adjacent the juncture of the blades 20, 30, 50 and lying diametrically across the attachment. The legs 61, 62 are bowed upwardly at their mid-portions, as at 63, to overlie two opposite beater blades. By reason of the springiness of the clamp the attachment may be slipped in place by lateral movement.

To secure the attachment when mounted on the beater, I provide a latch member 70 which may be stamped from sheet metal and pivotally mounted by a rivet or pin 71 in one end, placed so as to permit the latch to swing from the full line position of Fig. 2 wherein it is disengaged from all the other parts, into the dotted line or latching position. In latching position the mid-portion of the latch overlies the ends of the clamp legs 61, 62. It may be held there against any tendency to move into disengaging position by forming an arcuate recess 75 to fit around the shank of a rivet 76 whose head is spaced from the surface of the blade 20 sufficiently to admit the end of latch 70 to underlie the rivet head. There may be sufficient play in the pivot joint 71 to permit the latch to pass over the rivet 76 prior to becoming engaged beneath its head; or the latch may be of material possessing adequate springiness to accomplish that result.

If desired, two upwardly bowed portions 72, 74 may be provided in the central part of the latch forming passageways for the legs 61, 62 and tending to prevent lateral motion of the clamp 60.

In Figures 5-7 another form of my invention is illustrated. The common mixer head H has the usual sockets S¹, S² to detachably receive the shafts of conventional beaters, and will also receive shafts 80, 90 of my dual cooperating food choppers. The mixer motor and gears (not shown) cause the shafts 80, 90 to rotate oppositely. The shaft 80 is shorter than the shaft 90 so that the orbits of the choppers are different in elevation and in lateral position; but as viewed in plan the orbits overlap.

The chopper members though similar are not identical. They may be stamped or otherwise formed of sheet metal. Each chopper has four identical twisted blades, such as 81, spaced 90° apart, the leading edge, e. g. 82, being sharpened to a knife edge for chopping the food. The leading edge curves outwardly and upwardly to the point of the blade while the trailing edge curves inwardly and downwardly to the intersection with the cutting edge of the next blade.

In the lower chopper, the blades are twisted upwardly as in the upper chopper but in the opposite direction since the lower rotates oppositely to the upper.

The diameter of the choppers is preferably greater than the distance between the shafts 80 and 90 and the angular positions of the blades 81 relative to blades 91 are such that one blade 81 is 45° in advance of the next blade 91. By this arrangement the tendency of the lower blades is to move the food up into the path of the upper blades particularly at the point where the upper orbit overlies the lower and the greatest chopping efforts can be exerted.

The invention is not limited to the precise form of the blades or to a particular degree of curvature but may be effectively practiced with blades of the form and in the relative positions described.

Having now described my invention what I claim and desire to secure by Letters Patent is:

1. A food chopping attachment for the rotary beater of a food mixer of the type having a plurality of curved blades joined at the end of the beater, said attachment comprising a sheet metal member having a plurality of chopper blades extending radially from the axis of rotation of the attachment, the advancing edges of said chopping blades being sharpened, certain of said chopping blades extending upwardly and certain of said chopping blades extending downwardly to provide orbits of chopping both above and below the lower end of the beater, and a mounting member on the sheet metal member for manually attaching and removing the attachment, said mounting member being engageable with the top side of a beater blade and holding the sheet metal member against the lower side of the beater blade, one of said members engaging with a side edge of a beater blade for rotatively driving the attachment with the beater.

2. A food chopping attachment as claimed in claim 1 wherein one of said members is slotted to receive a beater blade therein and the edges of the slot engages the edges of the beater blade for rotatively driving the attachment with the beater.

3. A food chopping attachment as claimed in claim 1 wherein there are two mounting members on said sheet metal member for manually attaching and removing the attachment, at least one of said mounting members being pivoted.

4. A food chopping attachment as claimed in claim 1 wherein said mounting and attachment members have parts engaging the beater blades on opposite sides of the axis of rotation.

5. A food chopping attachment as claimed in claim 1 wherein said mounting member is bifurcated with resilient legs slidable over the beater blades on opposite sides of the axis of rotation.

6. A device as claimed in claim 1 having blade means alongside and between the first-mentioned blades with a cutting edge having portions extending upwardly and downwardly.

7. A device as claimed in claim 2 wherein the side blade means has an additional inwardly-directed cutting edge on the leading side of the blade means.

8. A device as claimed in claim 3 wherein there are two of said blade means each located on an opposite side of said first-mentioned blades.

9. A device as claimed in claim 4 wherein the inwardly-directed cutting edge of one of said side blades means is directed downwardly and the inwardly directed edge of said other side blade means is directed upwardly.

10. A device as claimed in claim 1 having two blade means alongside and between the first-mentioned blades with a cutting edge having portions extending upwardly and downwardly, said blade means being located on opposite sides of said first mentioned blades.

JANET C. MORRIS.

REFERENCES CITED

The following references are of record in the file of this patent:

UNITED STATES PATENTS

| Number | Name | Date |
|---|---|---|
| 267,491 | Carley | Nov. 14, 1882 |
| 1,074,397 | Westby | Sept. 30, 1913 |
| 1,549,889 | Moore | Aug. 18, 1925 |
| 1,850,199 | Bryant | Mar. 22, 1932 |
| 2,203,672 | Chester | June 11, 1940 |
| 2,284,155 | Landgraf | May 26, 1942 |
| 2,304,476 | Poplawski | Dec. 8, 1942 |
| 2,309,347 | Landgraf | Jan. 26, 1943 |
| 2,328,526 | Grove et al. | Aug. 31, 1943 |
| 2,352,232 | Strauss | June 27, 1944 |